Sept. 30, 1958 K. G. ÅHLÉN 2,853,855
POWER PLANTS COMPRISING HYDRAULIC TORQUE CONVERTERS
Filed May 27, 1948 4 Sheets-Sheet 3

INVENTOR
Karl Gustav Åhlén
BY
his ATTORNEY

United States Patent Office 2,853,855
Patented Sept. 30, 1958

2,853,855

POWER PLANTS COMPRISING HYDRAULIC TORQUE CONVERTERS

Karl Gustav Åhlén, Stockholm, Sweden, assignor, by mesne assignments, to Svenska Rotor Maskiner Aktiebolag, Nacka, Sweden, a corporation of Sweden Application May 27, 1948, Serial No. 29,445

Claims priority, application Sweden May 28, 1947

2 Claims. (Cl. 60—54)

The present invention relates to power plants and has particular reference to power plants including hydraulic torque converters of the hydrodynamic kind. Still more particularly the invention relates to power plants in which such converters are combined with internal combustion engine prime movers.

The invention is particularly applicable for use in the propulsion of vehicles and other forms of traction drives, and while its utility is not limited to such use it will hereinafter be discussed and its advantages be pointed out in connection with automotive vehicle drives because of its particular applicability to that kind of drive.

In vehicle drives employing variable speed power transmitters, it is ordinarily desirable to provide a relatively high ratio of torque multiplication under conditions of stall of the driven element, for producing rapid initial acceleration and also in order to have high tractive effort available at low vehicle speeds. In hydraulic torque converters of the hydrodynamic type as heretofore developed, the desired high starting or stall torque ratio has been obtained in either one of two ways, either by providing at least a three-stage turbine in the hydraulic circuit, through the use of which torque multiplications at stall of the order of 5 to 6 or more to 1 are obtained, or by combining a torque converter provided with a turbine having only one or two stages with some form of auxiliary torque multiplying gearing for further increasing the stall torque ratio under emergency or other conditions requiring a higher torque multiplication than a one or two stage torque converter is capable of providing, unless the converter is so geared to the vehicle wheels as to materially reduce the maximum vehicle speed efficiently obtainable in hydraulic drive, as compared with usual standards. Both of these expedients are relatively expensive either because of the cost of providing multiple stage converters with a relatively large number of blade rings or because of the cost of providing an auxiliary gear.

Also, as heretofore constructed, torque converters usually have a relatively constant torque absorbing characteristic which results in permitting the engine to rapidly speed up to maximum governed speed or a speed near to the maximum speed when the throttle is opened under stall conditions. This results in relatively very quick application of the full power of the engine at stall and very low turbine shaft speeds, but this type of operation is undesirable in many instances because of the noise level resulting from rapid acceleration of an engine from idling to full or near full speed while at stall and throughout the accelerating period, and is also undesirable because of the poor fuel economy resulting from such type of operation.

Modern internal combustion engines have been developed which are capable of and do give operating characteristics which are quite different from those of older engines, and there are now available internal combustion engines which, both as to speed and torque characteristics, are extremely flexible over a comparatively wide speed range. Typical of such engines are engines which produce maximum torque at speeds approximating half the speed at which full power is developed, the torque increasing from idling speed to maximum at somewhere in the neighborhood of half speed and thereafter dropping materially with increase of speed to the speed at which full power is attained. In some instances the drop in torque may amount to as much as approximately 40% from half speed to full speed.

Bearing in mind the above characteristics of certain kinds of engines and also having in mind the torque converting characteristics of the turbine type of hydrodynamic converter, it is a general object of the present invention to provide a new and improved form of hydraulic circuit, which, particularly in combination with an engine having varying power and torque characteristics of the general nature stated above, will provide improved overall tractive effort performance over a wide speed range inclusive of the required high driven shaft torque at stall and with high peak efficiency, with a fewer number of stages of blading than heretofore has been required in a comparable installation and with torque absorbing characteristics which enable the fullest possible use and advantage to be taken of the output torque characteristics and flexibility of the engine. A still further object of the invention is to provide a novel form of hydraulic torque converter which while having the characteristics noted above is capable of operation in two different ways in two different speed ranges of the driven or output member, so that in the low speed range torque multiplication equal to or exceeding that obtained with a larger number of stages is secured without increase in the number of rows of blades required, while in the high speed range of the driven member higher efficiency is maintained and torque multiplication or increase is obtained up to a relatively high ratio of the speed of the driven member to that of the driving member. Still another object is the provision of a novel torque converter arrangement having the advantages above discussed which will further enable the hydraulic torque converting mechanism to be used in alternation with a direct mechanical drive.

Still further objects of the invention and the advantages to be derived from its use will best be understood from consideration of the ensuing portion of this specification in which, by way of example but without limitation, different suitable embodiments of apparatus for carrying the invention into effect are described in conjunction with the accompanying drawings forming a part hereof, in which.

Figures 1, 1A, 1B, 1C, 1D:
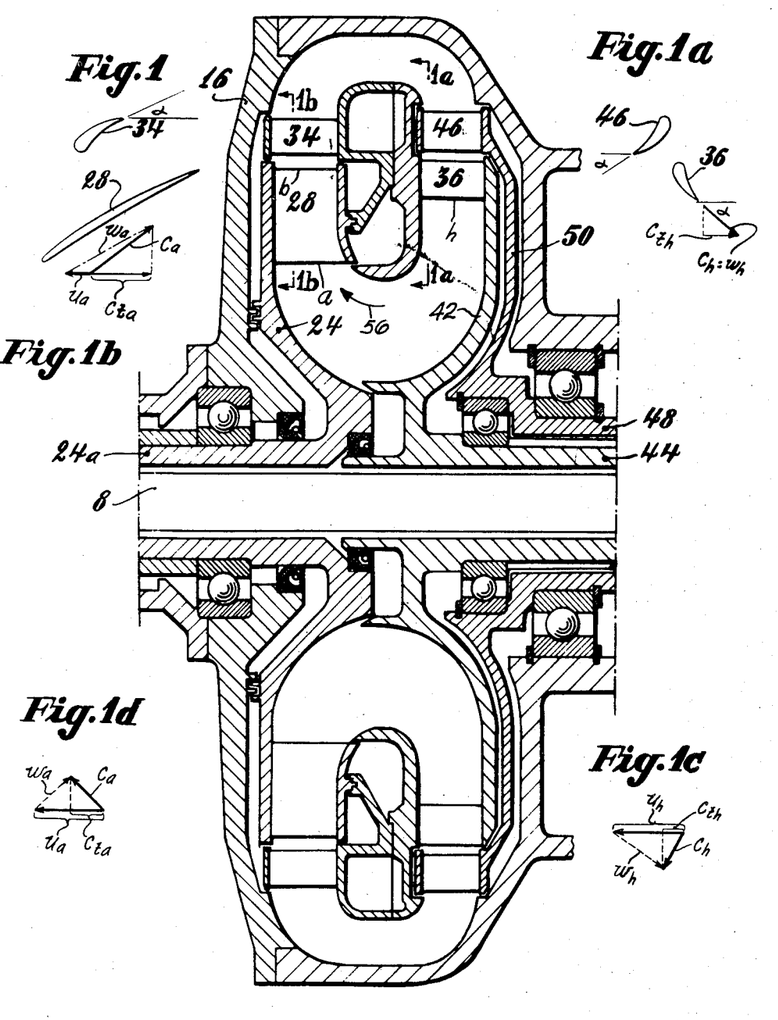
Fig. 1 is a longitudinal central section of the hydraulic circuit portion of a torque converter embodying the principles of the invention.
Fig. 1a is a section taken on the line Ia—Ia of Fig. 1 and including also a velocity diagram showing the nature of the flow of the fluid leaving the last turbine blades at stall.
Fig. 1b is a section taken on the line Ib—Ib of Fig. 1 and including a velocity diagram showing the flow of the fluid at the pump inlet at stall.
Fig. 1c is a flow diagram similar to the diagram of Fig. 1a but showing flow conditions at the changeover point.
Fig. 1d is a velocity diagram similar to the diagram of Fig. 1b and showing the conditions of fluid flow at the pump inlet at the changeover point.

Referring now more particularly to Fig. 1 the mechanism illustrated comprises a rotationally stationary casing 16 in which is rotatably mounted a pump wheel constituting the driving member of the apparatus and comprising a pump disc 24 carrying a ring of pump blades 28 and having a hollow hub or shaft part 24a adapted to be connected to the crank shaft or other power output member of a prime mover. Also mounted for rotation in the torus shaped chamber provided by casing 16 is the driven or turbine member comprising the turbine disc 42 and hollow turbine hub or shaft part 44. The disc 42 carries two rows of turbine blades 34 and 36, the former being located radially outside the pump blades 28 in the radial outflow part of the circuit while the latter are arranged in the radial inflow part of the circuit.

A ring of blades 46 situated in the circuit between blades 34 and 36 is carried by disc 50 connected to or formed integrally with the hollow hub or shaft part 48. For the sake of convenience the blades 46 will be referred to as reaction blades although as will hereinafter be explained in certain of the constructions embodying the invention these blades may constitute rotating rather than stationary reaction blades, in which case they also partake of the nature of turbine blades since they transmit power to the driven members when rotating in a direction opposite that of the pump blades.

Advantageously, but not necessarily, the turbine and reaction blading has the general form of profile with bluntly rounded inlet section characteristics of the blading disclosed in Lysholm U. S. Patent No. 1,900,118 and as will be seen from Figs. 1a and 1b the angles at which the blades are placed is such that when the hydraulic liquid is circulated by the pump in the direction indicated by arrow 56, it will tend to rotate blades 34 and 36 in the same direction as the direction of rotation of the pump and will tend to turn the reaction blades 46 in the opposite direction of rotation.

The general organization of the apparatus shown is known and is adapted to be employed in conjunction with a mechanical direct drive in the manner illustrated in Lysholm U. S. Patent No. 1,900,119, a direct drive shaft 8 passing through the hollow parts 24a and 44 being adapted to be connected in alternation directly with the power output element of the prime mover or with the pump member 24a by means of suitable clutches and the turbine or driven member 44 being adapted to be connected to the direct drive shaft 8 through the medium of an overrunning clutch. Since these structural arrangements are well known in the art (see Lysholm U. S. Patent No. 1,900,119) it is not necessary to illustrate and describe them herein for an understanding of the present invention. The reaction blades 46 may be either fixed against rotation by connecting the shaft 48 to the stationary casing 16 or, as will hereinafter be more fully explained, the shaft member 48 may be connected by means of suitable gearing to the driven shaft member 44 so that blades 46 instead of remaining stationary will rotate in a direction opposite to the direction of rotation of blades 34 and 36.

An important departure from prior constructions embodied in the present arrangement lies in the positions of the turbine and reaction blanding relative to the pump and particularly the relative radial positions of the last turbine stage and the pump, and as will be observed from Fig. 1 the blading is so arranged that the last stage of turbine blading 36 which rotates in the same direction as the pump discharges directly to the inlet of the pump without there being interposed between these blades any guide or reaction blades or turbine blading rotating in opposite direction. Also it will be observed that by placing the reaction blades and the last stage of turbine blading on the radial inflow side of the circuit opposite the side in which the pump is located, and further by placing the first stage of turbine blading 34 immediately outside the discharge edge of the pump blades, sufficient room is made available so that the outlet edges $h$ of the turbine blades 36 which discharge to the pump are located at a substantially greater radial distance from the axis of rotation of the blade rings than are the inlet edges $a$ of the pump blades 28.

The importance of the above described general arrangement and relation of the blading lies in the fact that with such an arrangement the characteristics of the converter are made such that as the speed of the driven or turbine member decreases relative to the pump speed toward stall, the torque absorbing capacity of the converter rises relatively sharply, so that the load on the engine and consequently its speed even if operating at full throttle is materially reduced as the turbine approaches stall condition. This provides a highly desirable operating characteristic for the power plant as a whole as will hereinafter be more fully explained.

The reason for the increasing torque absorbing characteristic with a blade arrangement such as that above described may best be understood from a consideration of the following discussion of the factors involved, with reference to the diagrams shown in Figs. 1a–1d of the drawings.

The hydraulic head produced by a vane type impeller such as the pump employed in converters of the kind under consideration, which is a measure of the input torque required to turn the pump, is expressed by the following well established formula:

$$H_p = \frac{M_p}{g}(u_b \times C_{tb} - u_a \times C_{ta})$$

in which:

$H_p$ is the pressure head developed by the pump;
$M_p$ is the pump efficiency;
$g$ is the gravity;
$u_b$ is the peripheral velocity of the pump at the outlet;
$u_a$ is the peripheral velocity of the pump at the inlet;
$C$ is the absolute speed of the working fluid;
$C_{tb}$ is the projection of $C$ on the tangent of the pump circle at the outlet;
$C_{ta}$ is the projection of $C$ on the tangent of the pump circle at the inlet.

From the formula it will be immediately apparent that the value of $H_p$ will change with change in the value of the factor $C_{ta}$ and in accordance with the present invention $H_p$ is caused to materially increase as the ratio of the secondary or turbine speed $n_2$ to the primary or pump speed $n_1$ ($n_2/n_1$) increases.

In order better to understand the nature of this characteristic let us first consider the velocity diagrams forming parts of Figs. 1a and 1b which illustrate the flow conditions obtaining at the outlet edge $h$ of the last stage of turbine blading and the inlet flow conditions at the inlet edge $a$ of the pump blading, when the pump is operating and the turbine is stationary or at stall, or in other words when the ratio $n_2/n_1$ is infinity. In the diagram of Fig. 1a the vector $C_h$ indicates the absolute speed and direction of the fluid leaving the blades 36 and also, since these blades are stationary, indicates as well the relative velocity $w_h$ since the peripheral velocity $u_h$ equals zero. The projection of C on the tangent of the turbine outlet circle is, as shown in the diagram, in the opposite direction from the normal direction of rotation of the blades, and is thus a minus value at stall. If this minus value were to be substituted in the above equation (in other words if it were to be assumed that $C_{th}$ were the same as $C_{ta}$) the expression in which this factor occurs would be negative and since the expression as a whole in the equation is negative the factor would in the equation be positive, thus resulting in a higher value of $H_p$ than would be the case if $C_{th}$ were positive.

It is, however, fundamental to hydraulic circuits of the kind under consideration that the tangential component of flow $C_{ta}$ increases with decrease in the radius of the circle to which the flow is tangent, and this increase is in direct proportion to the change in radius of the circle. In this connection it is to be noted that this change in tangential velocity is substantially independent of the variation in the rate of circulation of the fluid in the circuit, that is, the quantity of fluid circulated through the blade per unit time. The effect of this characteristic is best illustrated by the diagram associated with Fig. 1b which illustrates the inlet flow conditions at the pump with the arrangement shown when the turbine is at stall. In this diagram the vector $u_a$ indicates the peripheral speed of the pump blading while the vector $C_{ta}$ represents the tangential velocity component of the fluid entering the blading. By comparison of the diagram of Figs. 1a and 1b it will be seen that the vector $C_{ta}$ is substantially greater than the vector $C_{th}$. With the blading laid out as shown in Fig. 1 the radius of the edges $h$ is approximately 30% greater than the radius of the edges $a$ and consequently vector $C_{ta}$ is approximately 30% greater than the vector $C_{th}$. The sense of the vector $C_{ta}$ is still negative and if substituted in the equation results in a substantially higher value of $H_p$ than if the vector $C_{th}$ were substituted in the formula, which would be the case if the radii of edges $a$ and $h$ were equal. Consequently by placing the outlet edges of the last turbine stage, which rotates in the same direction as the pump and delivers directly to the pump, at a substantially greater radius from the axis of rotation than the inlet edges of the pump blades, substantially higher torque absorbing characteristics are imparted to the pump at stall than would otherwise be the case.

While the above stated condition at stall is for the purposes of the present invention highly desirable and may be varied in degree to suit individual conditions by choosing the proper relation between the radii of the edges $a$ and $h$, this condition would not be desirable if it were to hold good as a more or less constant relationship over the normal speed range of operation of the turbine. However, such constancy of the relationship does not obtain as may best be explained by reference to Figs. 1c and 1d. These diagrams are representative of conditions which in a typical design may obtain when the speed ratio $n_2/n_1$ is greater than 0.5, which is representative of the higher portion of the normal speed range of the turbine with respect to pump speed, converters of the kind under consideration ordinarily reaching a condition of operation at which the output torque drops to a value equal to the input torque when the speed ratio $n_2/n_1$ is of the order from 0.6 to 0.8.

In the diagram of Fig. 1c the peripheral velocity of the turbine blades is represented by vector $u_h$. The relative velocity of the fluid leaving the turbine blades is shown by vector $w_h$, and due to the peripheral velocity $u_h$ the absolute velocity of the fluid leaving the blades is as shown by vector $C_h$. The tangential projection of this velocity is shown by vector $C_{th}$, and it will be observed that the direction of this tangential component of velocity is the same as the direction of rotation of the blades, so that the sense or sign of this factor is positive, rather than negative as at stall.

If this positive value is substituted in the above formula the factor in the equation of which it is a part is positive and is consequently subtracted rather than added to the remaining factors in the equation. The result of this is that the hydraulic head produced by the pump is less than at the condition of stall.

If we now consider the diagram of Fig. 1d the peripheral velocity at the inlet of the pump is shown by vector $u_a$, the relative inlet velocity of the fluid to the pump by vector $w_a$ and the absolute velocity of the liquid at the pump inlet by the vector $C_a$. The tangential component of the absolute velocity is shown by the vector $C_{ta}$ and again as in the case of the condition at stall, due to the difference in radii between the blade edges $h$ and $a$, the tangential component $C_{ta}$ is larger than the component $C_{th}$, the difference in magnitude being proportional to the ratio of the radii $a$ and $h$. It follows then that if we substitute the larger plus value of $C_{ta}$ in the formula, the result is a further decreased value of $H_p$.

Again referring to the four diagrams of Figs. 1a-1d, we find that the result of moving the outlet edge of the last stage of turbine blading to a greater radius than the inlet edge of the pump blading has the effect of materially increasing the torque absorbing characteristic of the pump as the turbine speed is decreased from its normal operating range to stall, as compared with a construction in which these two sets of blade edges are on the same or nearly the same radii or with the turbine blade outlet edges on a shorter radius than the pump inlet edges. If for example we assume that the edges $a$ and $h$ are on the same radius, the difference in the value of $H_p$ as between stall and a value of 0.5 or above for the speed ratio $n_2/n_1$ is represented by the change in the values of the vectors $C_{th}$ and $C_{ta}$ which here are equal, with the value of $H_p$ increasing but little as the turbine speed decreases from a given $n_2/n_1$ ratio to stall.

On the other hand, with the present arrangement this variation in the value of $H_p$ as the turbine speed decreases toward stall is represented by the change in value of the product of the vector $C_{th} \times r_h/r_a$, and as will be evident from the preceding discussion this represents a very material increase in the amount by which the pump head is increased at stall by placing the last turbine outlet edges materially further from the axis of rotation than the inlet edges of the pump blades.

It is an established fact that the rate of circulation of the working fluid in the circuit is a function of the hydraulic head $H_p$ developed by the pump, the rate increasing with increase in the hydraulic head. Consequently the present construction which tends to rapidly increase the value of $H_p$ as the turbine approaches stall also causes the rate of circulation to increase, with the net result that the torque absorbing characteristic of the converter is rapidly increased as the turbine speed decreases. The desirability of this characteristic, particularly when combined with certain obtainable torque output characteristics of internal combustion engines, will later be shown, but before considering that phase of the invention a further characteristic of the nature of the increase in torque absorption as stall condition is approached, as obtained by the present invention, must be taken into consideration.

As has previously been noted, it is a basic characteristic of converters of the kind under consideration that the value of the secondary or output torque falls, as the speed of the turbine member increases from stall, to a value equal to the input torque before the speed of the turbine member reaches the speed of the pump, the value of the ratio $n_2/n_1$ at which the torque ratio becomes 1:1 being ordinarily somewhere in the range of from 0.6 to 0.8. The speed ratio $n_2/n_1$ at which the torque ratio becomes 1:1 is ordinarily referred to as the shift or changeover point since when the torque ratio falls to 1:1 value some form of drive other than continued drive through the torque converter should be employed if a still higher rate of driven shaft speed relative to pump or engine speed is desired. It is highly desirable, for reasons which will later be discussed, to provide for the purposes of the present invention a relatively high ratio between the values of the torque absorbing characteristic of the converter at the shift point and the torque absorbing value at stall. In many instances it may be desirable to provide a construction in which the converter will absorb five to six or more times as much torque at stall as at the shift-over point, and in some special cases it may be desirable to have the torque absorption at stall as much as ten times the torque absorption at the shift-over point.

We have previously seen how in accordance with the present concept torque absorption at stall as compared with torque absorption at or near the shift-over point can be materially increased by the relative radial positions of certain of the blade edges. I have found that there is a certain necessary relationship between the radius of the last stage turbine outlet edges and the radius of the pump inlet edges which must be employed if the desired results are to be obtained. The nature of this relationship may best be understood by referring to Fig. 1e in which the ratio of the input torque at stall ($M_{1\ stall}$) over the input torque at shift ($M_{1\ shift}$) is plotted as ordinates, and the ratio of the radius of the last stage turbine blade outlet edges ($r_h$) over the radius of the pump blade inlet edges ($r_a$) is plotted as abscissa.

Figures 1E, 1F, 2, 3:
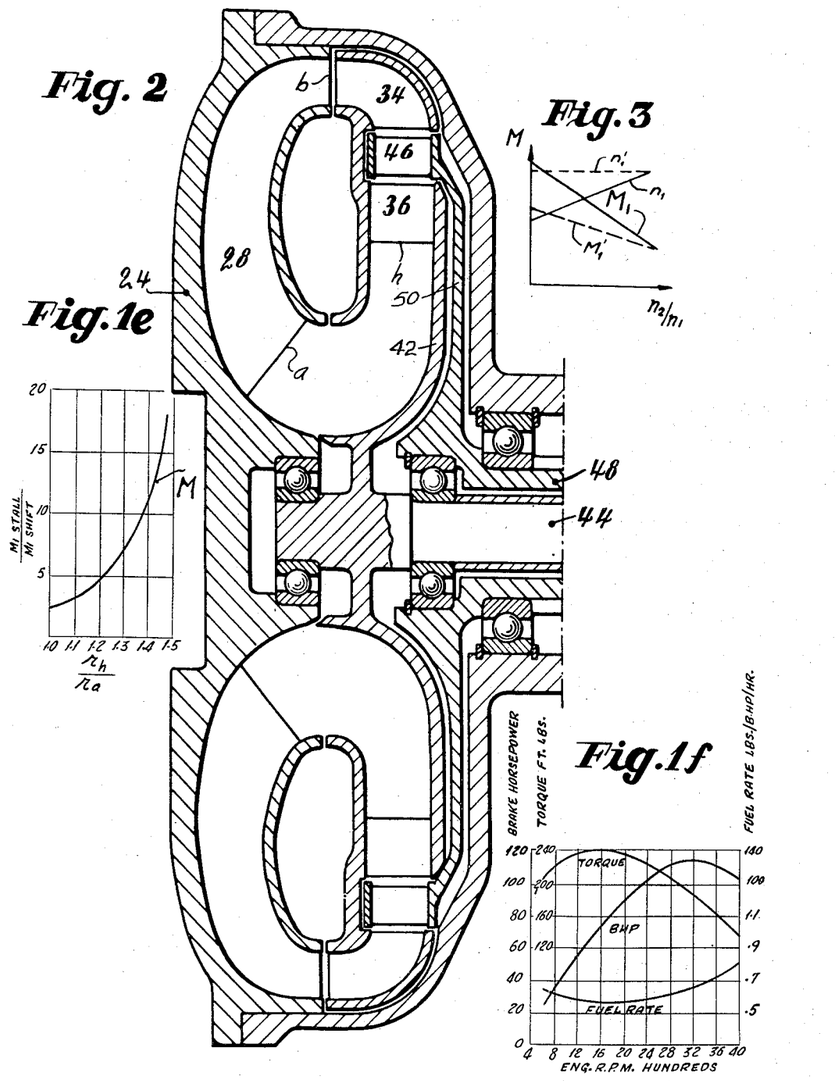
Fig. 1e is a diagram illustrative of input torque absorbing characteristics of a converter embodying the principles of the present invention.
Fig. 1f is a diagram showing the power and torque characteristics of an engine of the kind contemplated by the present invention.
Fig. 2 is a section similar to Fig. 1 showing another form of converter embodying the principles of the invention.
Fig. 3 is a more or less conventionalized diagram illustrative of certain torque characteristics of converters embodying the invention.

In the diagram the curve M represents the ratio of the inlet torques at stall and shift, and as will be seen from the nature of the curve the increase in the value of the ratio of the input torque at stall as compared with input torque at shift does not increase as a straight line function with increase in the radius of the turbine blade outlet edges as compared with the radius of the pump inlet edges. On the contrary, the more the latter ratio is increased the more rapidly the torque ratio increases and as will further be seen from the curve, placing the last turbine stage blades so that their outlet edges are at a radius within the range of not more than approximately 15% greater than the radius of the pump inlet edges produces small appreciable effect in increasing the ratio of the input torques at stall and shift. As shown by curve M, which is based upon test results, a value of approximately 2.5 for the torque ratio $M_{1\ stall}/M_{1\ shift}$ for a given converter was obtainable with a blade arrangement in which the turbine outlet edges $h$ and the pump inlet edges $a$ were at approximately the same radius. In such a converter, shifting of the turbine blade edges $h$ to a radius approximately 10% greater than the radius of the pump inlet edges $a$ resulted in very little increase of the value of $M_{1\ stall}/M_{1\ shift}$, to a value a little over three. On the other hand, however, a change of position of the turbine outlet edges $h$ to a position having a radius 50% greater than the pump inlet edges $a$ resulted in an increase in the value of $M_{1\ stall}/M_{1\ shift}$ to approximately 18, or in other words an increase in the value of the ratio of approximately seven times. A value of the ratio $M_{1\ stall}/M_{1\ shift}$ as high as 18 is one that usually will not be required. Other design factors make it ordinarily more difficult to properly design a converter with a ratio $r_h/r_a$ of 50% or more than to design an equivalent converter with a smaller value of this ratio. Consequently in order to obtain the maximum benefit from the present invention, it is preferable to so construct the blading that the ratio $r_h/r_a$ is within a range of which the lower limit is approximately 1.15 and the upper limit a ratio determined by practical requirements but ordinarily not over approximately 1.5.

In connection with the foregoing discussion it is further desirable to point out that change in the outlet angle of the turbine blading, particularly that of the last turbine stage, also influences the characteristics of the input torque absorbing characteristics of the converter. If the outlet angle of the last stage turbine blades is increased the effect will tend to decrease the value of the torque absorption of the converter over the entire range from stall to shift point, and vice versa. However, the effect of varying the outlet angle of the last turbine stage blading is less for a relatively high value of the $r_h/r_a$ than for smaller values of that ratio.

With blade arrangements embodying the present invention a wider variation in the outlet angle of the last stage turbine blading is available to the designer, to meet specific conditions than has heretofore been the case. Preferably this angle will not be less than approximately 20° as a lower limit, but may in certain more or less extreme cases be made as high as 90° or even slightly greater, the latter case providing what may be considered a negative outlet angle. For most requirements however the limits of the range will lie within approximately 35° as a minimum value and 55° as a maximum value.

With a converter having the characteristics provided by the principles above discussed in mind we will now consider the nature of the improved results obtained in a power plant as a whole which combines such a converter with an internal combustion engine of the kind having a relatively wide speed range and further having an output torque characteristic which provides a materially decreasing torque from a maximum value which occurs at approximately the mid-speed range to a substantially lower value at both low speed and the speed at which maximum power is developed.

In the preceding discussions the various factors and characteristics have been considered on the basis of operation of the converter at constant input shaft speed, but as will have already been understood the object of the invention is to provide a converter and power unit which will result in actual vehicle operation which will make use of highly variable input shaft speeds and in connection with the following discussion concerning the cooperative relation between a converter embodying the present invention and a variable speed, variable torque, internal combustion engine, it must be borne in mind that, other conditions being equal, the torque absorbing characteristic of a converter of the kind under consideration is such that the torque absorption for any given ratio $n_2/n_1$ varies substantially as the square of the input shaft speed.

In order more clearly to illustrate the nature of the performance obtained there is shown in Fig. 1f a diagram giving the horsepower, torque and fuel economy characteristics of a known eight-cylinder internal combustion engine of 324 cubic inches displacement (3¼" x 4⅞") in commercial production. As will be seen from the diagram, peak horsepower of 115 is obtained at 3200 R. P. M. while peak torque of 240 foot pounds is obtained at 1600 R. P. M., the value of torque falling to 185 foot pounds at 3200 R. P. M. and to this same value at approximately 500 R. P. M.

The type of engine illustrated is suitable for vehicle propulsion with a transmission in which a mechanical direct drive is used in alternation with converter drive, and in such drives there is always what may be termed a "vehicle shift point" which occurs at the speed where with full throttle operation of the engine higher vehicle speed in converter drive would be less advantageous than a shift to direct drive. This shift point always occurs when the speed ratio $n_2/n_1$ in hydraulic drive is less than one, and when shift is made to direct drive the speed ratio $n_2/n_1$ becomes unity, so that the engine speed is reduced when the shift to direct drive is made. With an engine having a rising torque curve with reduction in speed from full speed, proper vehicle shift point should be at the ratio $n_2/n_1$ developing a torque multiplication in the converter which is equivalent to the rise in engine torque occasioned by the reduction in engine speed resulting from the shift to direct drive. With such a location of the vehicle shift point the power delivered by the driven shaft in converter drive just before the shift and in direct drive just after the shift will thus be approximately the same.

If we now consider the engine for which the characteristics have been given above the proper application of a typical converter embodying the present invention, insofar as a proper shift point is concerned, would for example call for a design in which the ratio of secondary torque to primary torque $(M_2/M_1)$ would have a value of approximately 1.23 at a speed ratio $n_2/n_1$ of about .68 and with an efficiency at that speed ratio of about 84%. A two-stage converter having such characteristics may readily be provided by following known principles of design.

If we now consider as connected to the above noted engine such a converter constructed of a size to absorb 115 horsepower at a speed ratio $n_2/n_1$ of .68, the power delivered to the driven or propeller shaft through the converter with the engine operating at 3200 R. P. M. and developing 115 horsepower at that speed will be approximately 96 horsepower. When the shift to direct drive is made from such shift point the speed of the engine (assuming constant vehicle speed) will drop to 2200 R. P. M., at which point the engine develops approximately 96 horsepower, and since the direct drive is substantially 100% efficient the power delivered to the driven shaft will be approximately the same as that developed through the hydraulic drive just before the shift is made.

By combining with an engine of the kind described, which has a sharply rising torque characteristic with decrease in speed from full speed, with a torque converter having characteristics contemplated by the present invention, which enables such an engine to be used effectively, the advantage is gained that the vehicle shift point can be made at a condition of converter operation where the converter is still providing torque multiplication, rather than at a higher ratio of $n_2/n_1$ where the converter has ceased to provide any increase in secondary torque over primary torque. If for example, an engine were employed having a substantially flat torque curve over the upper portion of the speed range, there would be little if any rise in engine torque when shifting to direct drive to compensate for the drop in engine speed caused by shifting to direct drive. Consequently, in such case the proper shift point should be at the point where substantially no torque multiplication is produced in converter drive. The reason why it is advantageous to have the shift point located at a point where the torque converter is producing torque multiplication is that ordinarily the range of operation of the converter from a point where it may be producing a torque multiplication of around 1.25 to one to a point where no torque multiplication is produced is relatively inefficient as compared with the range where higher torque multiplication in the converter is developed. Consequently, by being able to place the shift point at a point where there is some torque multiplication being produced in the converter, the higher and less efficient range of the speed ratio $n_2/n_1$ of the converter is avoided.

If now we further assume that the converter is, in accordance with the principles of the present invention, so designed that the ratio $M_1$ stall/$M_1$ shift is equal to about 6.4, which in accordance with the curve shown in Fig. 1e indicates a placement of the outlet edges of the last stage turbine blades relative to the inlet edges of the pump blades so that the ratio $r_h/r_a$ is approximately 1.25, the rising torque absorbing characteristic of the converter will be such that if driven by the engine discussed above, it will under stall conditions pull the engine speed down to about 1600 R. P. M. from the 3200 R. P. M. speed representing full throttle engine speed at the shift-over point. With a converter of this kind it is readily possible to provide for a torque multiplication $M_2/M_1$ of at least 3.5 at stall. This torque multiplication combined with the rise in engine torque from 185 foot pounds at 3200 R. P. M. to 240 foot pounds at 1600 R. P. M. results in an overall torque multiplication of approximately 4.75, which is an adequately high value for the transmission portion of the usual vehicle drive and in many instances such as passenger car applications may be substantially more than is necessary.

In addition to the advantage gained in this fashion, further important advantages are gained. By providing a converter which will pull the engine speed down to as low as 1600 R. P. M. at stall the undesirable rapid acceleration of the engine from idling speed to full speed or near full speed upon starting a vehicle is avoided. Rapid acceleration of an engine to high speed upon starting is undesirable because of unavoidable noise and is further undesirable because of the fact that such operation is uneconomical from a fuel consumption standpoint. By holding the engine speed down at start and during the early stages of vehicle acceleration the engine is operated on the most economical portion of the specific fuel consumption curve as will be evident from Fig. 1f, and if the installation is of the kind above described, it will further be seen that from a stall condition with the engine operating at 1600 R. P. M. the first acceleration will occur with further rise in engine speed over a speed range where the power developed by the engine increases relatively rapidly even with a slightly falling value of engine torque.

In the above discussion we have assumed the application of a converter designed with blading providing $M_1$ stall/$M_1$ shift value of 6.4. If desired, this value as has previously been pointed out, can readily be increased to a substantially larger value in which event the engine speed at stall could be pulled down to an even lower value, as for example 1200 R. P. M. If that were done a somewhat lower tractive effort at stall would be obtained but on the other hand the tractive effort curve would not drop so rapidly upon initial movement of the vehicle from stall, because as the vehicle moved from stall the engine would initially be working on a rising portion of its torque curve.

From the foregoing discussion it will therefore be evident that regardless of the specific form of the converter, when the blade system is designed in accordance with the invention and the converter is combined with an engine having certain specific power and torque characteristics, numerous substantial advantages are obtained for a traction drive with a converter which may be relatively simple in construction and having relatively very few stages of blading.

The invention is applicable to many specific kinds of converters and in Fig. 2 there is shown a blade system incorporated in a converter having a rotating casing rather than a stationary casing with a through direct drive shaft as in Fig. 1. As shown in Fig. 2, the primary or driving member 24 is constituted by a rotating casing adapted to be connected to and driven by the engine (not shown). The casing carries the pump or impeller blades 28. The turbine disc 42 carries the two stages of turbine blades 34 and 36 while the reaction blades 46 are carried by the reaction disc 50 as previously described. In addition to embodying a rotating casing, the present example differs from the preceding design in that the first stage turbine blades 34 are located on the radial inflow side of the circuit so that longer pump blades are provided, and the outlet edges $h$ of the last stage turbine blades 36 are placed considerably further from the axis of rotation, relative to the inlet edges $a$ of the pump blades, than in the case illustrated in Fig. 1. The instances in which this relatively high ratio between these radii may be desirable will be discussed in connection with a further embodiment of the invention.

In Fig. 3 a more or less conventionalized diagram indicates the characteristics of the converter shown as compared with earlier known types of converters, in terms of the input-output ratio $n_2/n_1$. In this diagram the solid lines $M_1$ and $n_1$ indicate respectively the input torque absorbing characteristics and the resultant input speed characteristics of the present converter while the dotted lines $M_1'$ and $n_1'$ indicate the corresponding characteristics of what may be termed a conventional prior form of converter.

In the description and discussion with reference to the preceding embodiments the nature and characteristics of the invention have been considered without regard to the factor of whether or not the reaction blading 46 is restrained during converter operation against rotation in a direction opposite that of the pump and turbine or is incorporated in the apparatus so that when the converter is operating this reaction blading rotates in the opposite or counter direction and becomes in effect moving rather than stationary reaction blading and also through a gear connection operates to transmit torque to the driven member and thus also may be considered as counter-rotating turbine blading.

The use of counter-rotating turbine blading is broadly known and for convenience converters embodying this construction will hereinafter be referred to as double rotation converters as distinguished from single rotation converters in which the reaction blading is restrained against counter-rotation.

Figure 4:
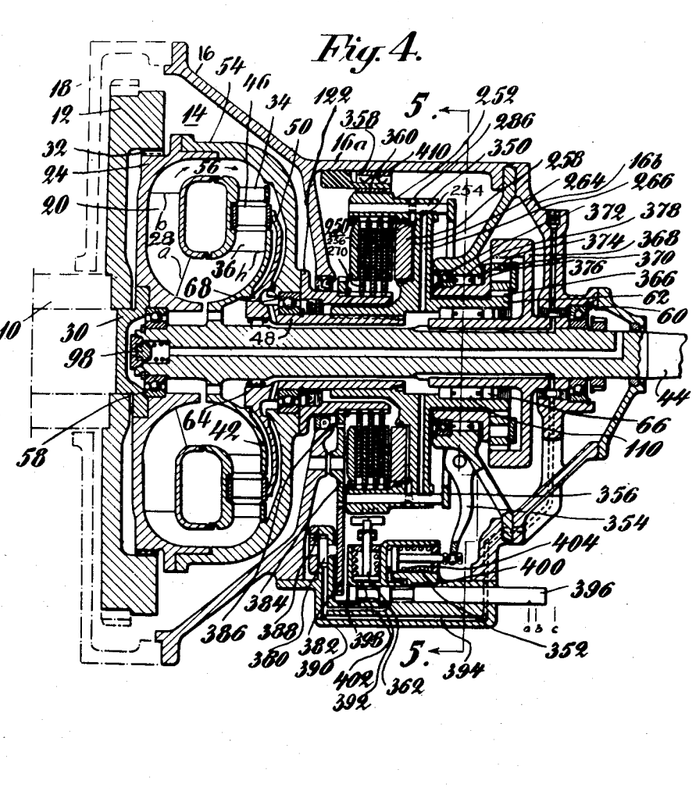
Fig. 4 is a central longitudinal section of a converter embodying the invention and incorporating a mechanical direct drive for use in alternation with converter drive.
Figure 5:
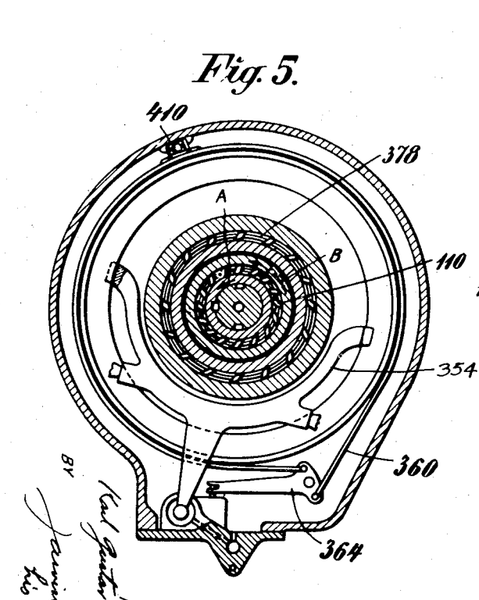
Fig. 5 is a section taken on the line 5—5 of Fig. 4.

The present invention is particularly advantageous when incorporated in double rotation converters, for reasons hereinafter to be pointed out, and by way of example there is shown in Figs. 4 and 5 an embodiment of the invention in the form of a double rotation converter combined with a direct drive.

Referring now to Figs. 4 and 5, the hydraulic circuit illustrated is embodied in a structure of the rotating casing type in which the rotating casing 24, which is driven from the engine flywheel 12 through the spline or tooth connection 32, carries the pump blades 28. The turbine shaft 44, which is carried by bearings 58 and 60, is provided with a wheel portion 42 which carries the two rows of turbine blades 34 and 36. Between these rows of blades, the row of reaction blades 46 is carried by disc 50 forming a part of the reaction member having a hollow shaft portion 48 to which is keyed a hollow shaft extension 62. Between the turbine shaft 44 and the extension 62 of the reaction member there is located a free-wheel clutch 110 so arranged that if the reaction member tends to turn in the same direction as the driven shaft member 44 the clutch will engage to thereby prevent the element 62 from overrunning shaft 44, while freely permitting relative rotation between the parts in opposite directions.

Member 62 further is provided with a sun gear 366 meshing with planet gears 370 which in turn mesh with an internal ring gear carried by a member 368 keyed to the driven member 44. The planets 370 are carried by a suitable planet carrier 376 between which and the stationary casing 16 there is located a free-wheel brake 378 so arranged as to engage to prevent the planet carrier from rotating in a direction opposite that of the pump and turbine members and to permit the planet carrier to rotate freely in the same direction as these members.

A multiple disc friction clutch 250 is interposed between the rotating casing 24 and the reaction member. This clutch comprises a number of axially movable clutch plates 270 keyed or splined on the extension 122 of the rotating casing and a number of interleaved clutch plates 254 axially keyed or splined on a bell-shaped extension 252 of the reaction shaft 48. The latter also carries an axially stationary backing plate 256 and an axially movable clutch actuating plate or piston 258 located in a suitable annular recess in the member 252 and adapted to be moved to engage the clutch by hydraulic pressure admitted to or released from the chamber 264 under the control of a valve member 350.

The valve member 350 is actuated to cause engagement or disengagement of the clutch through the medium of a pivoted fork 354 (see Fig. 5) the action of which is controlled by a system of hydraulically actuated servomotors 352 and 362 to which pressure fluid is admitted or released under the control of the axially movable valve 396. Fluid under pressure for operating these servomotors and also for maintaining desired basic hydraulic pressure in the converter circuit is supplied by means of the gear pump 380 driven from the extension 122 of the rotating casing through the medium of the intermediate gear 384 meshing with gears 386 on the part 122 and gear 382 on the pump shaft.

The outer circumference of the extension 252 on the reaction member provides a brake drum surface adapted to be engaged by a band brake 358 for holding the reaction member rotationally stationary. This brake through the medium of the band 360 and actuating lever 364 is engaged by upward movement of the piston of the servomotor 362 and released by the action of the spring forming a part of that device. A spring arrangement 410 is provided for retracting the brake band to prevent dragging when the latter is released.

The action of the servomotor arrangement is such that when the valve 396 is moved to the position $a$, pressure fluid is not admitted to the clutch 250 so that the latter is released to disconnect the rotating casing from the reaction member. Also in this position of the control valve the brake band 360 is released to permit the reaction member to rotate freely in either direction insofar as the brake is concerned. Under these conditions, it will be seen by reference to Figs. 1$a$ and 1$b$ that the reaction blades will rotate in opposite direction with respect to the turbine blades 34 and 36, it being noted that in the present construction the first turbine stage blades are located on the radial inflow side of the circuit rather than radially outside the pump blades 28, as in the blade arrangement shown in Figs. 1 and 2. This condition provides for double rotation operation of the converter, the torque from the reversely rotating reaction blades (which under this condition are in effect also turbine blades) being transmitted through the reaction element 62, gears 366, 370 and 368 to the driven member 44. The nature of the torque developed is such that it will tend to cause the planet carrier 376 to rotate in a direction opposite that of the driven member, but this is prevented by the action of the free-wheel brake 378. If the valve 396 is shifted to position $b$ the resultant action of the servomotor system will be to cause the band brake 358 to engage brake drum surface on the extension 252 of the reaction member and hold the latter member against rotation, while at the same time still not admitting actuating fluid to the clutch 250. Under this condition the blades 46 become stationary reaction blades and the converter operates as a single rotation converter. With the reaction member locked against rotation, the sun gear 366 of the planetary gearing is stationary while the ring gear connected to the driven member continues to rotate in forward direction. This, of course, requires that the planet carrier 368 also rotate in forward direction, and this action is permitted by the freewheeling action of the free-wheel brake 378 between the carrier and the stationary casing.

If the control valve 396 is moved to position $c$ the servomotors act to again release the brake 358 and also act to actuate the member 354 so as to move the valve 350 to the left as seen in Fig. 4 and thereby admit pressure fluid to the chamber 264 behind the clutch actuating plate 258 so that the clutch 250 is engaged. This serves to mechanically connect the rotating casing directly with the reaction member which in turn transmits power mechanically to the driven member 44 through the medium of the free-wheel clutch 110. Since under this condition the reaction and driven members travel at the same speed in forward direction there is no relative movement between the gears of the planetary gear system which is permitted to rotate in forward direction as a unit through the overrunning action of the free-wheel brake 378. Also since the band brake 358 is released the clutch assembly 250 is also free to rotate.

So far as the present invention is concerned any desired specific form of clutch and the manner of its actuation may be employed and consequently the servomotor system for actuating the clutch is not described herein in greater detail than necessary to understand the functioning of the transmission illustrated in order to secure double rotation, single rotation and direct drive. The details of the clutch and brake actuating mechanism shown form a portion of the claimed subject matter of my U. S. Patent No. 2,719,616, granted October 4, 1955, in which this portion of the apparatus is described in greater detail and to which reference may be had.

Insofar as the specific hydraulic circuit shown in Fig. 4 is concerned, it will be evident that this embodies the principles previously discussed in connection with Figs. 1 and 2, and it will be evident that the specific structure shown in Fig. 2 may readily be incorporated in the organization shown in Fig. 4. Also in connection with Fig. 4 wherein the inlet edges $a$ of the pump blades are inclined, the mean or average distance of these edges from the center of rotation is to be taken as the radius of these edges when considered in connection with the ratio of this radius with the radius of the turbine outlet edges $h$.

Figures 6, 8:
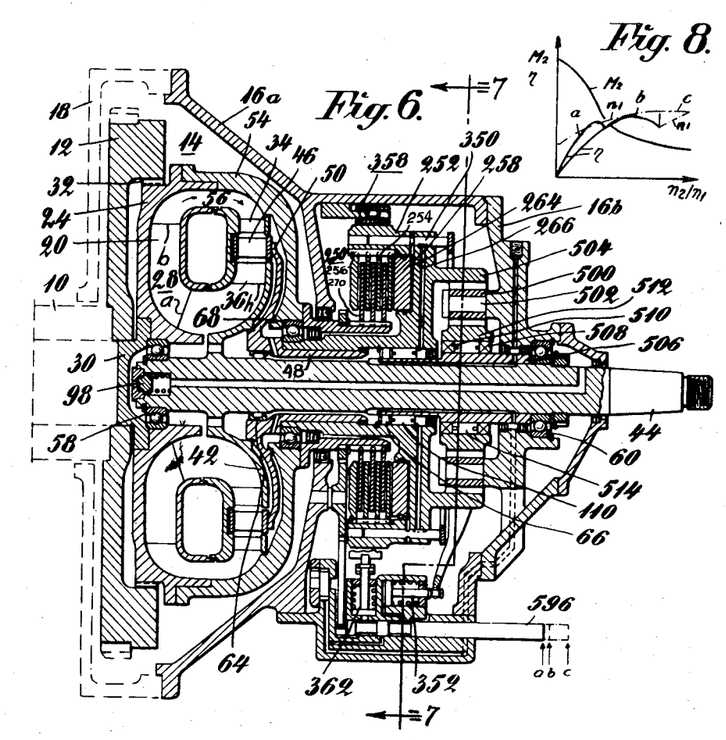
Fig. 6 is a section similar to Fig. 4 showing another and similar form of converter with direct drive embodying the invention.
Fig. 8 is a diagram illustrative of the efficiency and torque characteristics of converters of the kind shown in Figs. 4 and 6.
Figure 7:
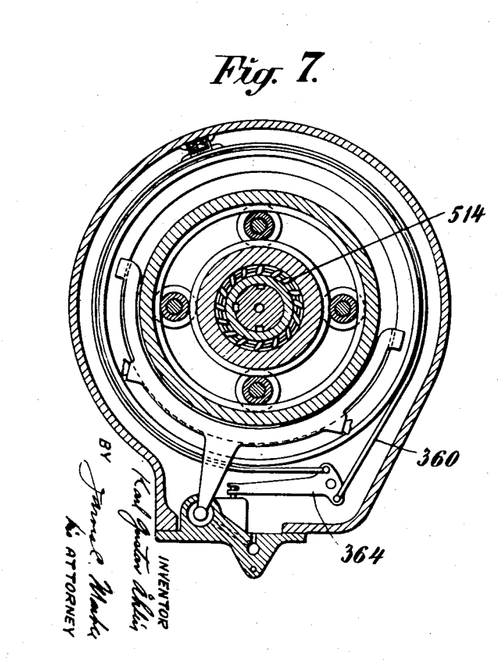
Fig. 7 is a section taken on the line 7—7 of Fig. 6.

In Figs. 6 and 7 another example of a double rotation converter embodying the principles of the invention is illustrated. The construction of this embodiment is similar in all respects to that shown in Fig. 4 except for the arrangement of the planetary gearing connecting the reaction and turbine members and need not again be described in detail. In the present arrangement the extension 252 of the reaction member carries an axially extending annular flange providing a ring gear 504 meshing with pinions 500 which are carried on pins 502 extending from the stationary casing 16. Pinions 500 mesh with a sun gear 512 between which and the driven member 44 there is located the free-wheel clutch 514. The free-wheel clutch 514 is arranged to permit the gear 512 to rotate oppositely relative to the driven member 44 and to engage to prevent gear 512 from overrunning the driven member 44 in the same direction.

In the operation of this form of the transmission the position $a$ of valve 596 results in release of the clutch 250 and the band brake 358 to permit the reaction blades to rotate in reverse or counter-direction. Torque from these blades is transmitted through the reaction member to gear 504 and through the medium of the pinions 500 the direction of the drive is reversed so that torque is applied through clutch 514 in forward direction to the driven member, double rotation operation thus being effected. In position $b$ of valve 596 the band brake 358 engages member 252 to lock the reaction member against rotation and secure single rotation operation of the converter. When the reaction member is locked against rotation this also prevents rotation about their individual axes of the pinions 500 and likewise prevents rotation of the sun gear 512. This gear can, however, remain stationary while the driven member 44 is turned in forward direction due to overrunning action of the clutch 514.

Movement of the control valve 596 to position $c$ again releases the band brake 358 and admits pressure fluid to clutch 250 to engage the latter. Under this condition the reaction member, which is now mechanically connected to the rotating casing 54, transmits power from the latter directly to the driven shaft through the medium of the overrunning clutch 110, which is arranged so as to engage whenever the reaction member tends to overrun the driven member in the same direction. Under this condition of drive the ring gear 504 on the reaction member rotates in forward direction and through the action of the pinions 500 causes the sun gear 502 to rotate in a direction opposite that of the driven member, this being permitted by the action of the overrunning clutch 514.

As previously noted, the principles of the invention are particularly advantageous when embodied in a converter capable of double rotation operation. The reason for this is that inherently it is possible to provide a higher ratio of torque multiplication $(M_2/M_1)$ with a double rotation converter than with a single rotation converter, other things being equal. Briefly, the reason for this is that in any torque converter the secondary torque $M_2$ must always equal the sum of the primary torque $M_1$ and the reaction torque $R_1$ transmitted to the stationary casing or other stationary abutment. In the case of a single rotation converter the reaction torque $R_1$ transmitted to the stationary abutment is equal to the torque R which is hydraulically applied by the working fluid to the reaction blading. In the case of a double rotation converter, however, the torque $R_1$ transmitted to the stationary abutment is equal to the torque R plus the value of the torque R multiplied by the gear ratio (which we will call $k$). Thus, other things being equal, the value of $M_2$ at stall for example will be larger with a double rotation converter than with a single rotation converter. As an example of the difference in stall torque ratios obtainable with the two types of converters it may be pointed out that with present three-stage single rotation torque converters having acceptable efficiency and other characteristics, the maximum stall torque ratio usually obtained is of the order of from five to one to six to one. Theoretically, with a double rotation converter an extremely high stall torque ratio is obtainable if other desirable characteristics are sacrificed, but with designs which provide satisfactory efficiency and range characteristics, stall torque ratios as high as twelve to one are readily obtainable in a two-stage converter.

Bearing in mind the high stall torque ratio that can be obtained with a double rotation converter, the particular advantage of a converter of this type embodying the principles of the present invention is found in the fact that with a high stall torque ratio built into the converter and a high value of $M_2$ stall/$M_2$ shift also built into the converter by a relatively high ratio of $r_h/r_a$ the latter characteristic can be utilized to pull the engine speed at stall down to comparatively a very low value, even approaching a speed of the order of ordinary idling speed in extreme cases. By way of example, let it be assumed that the normal full speed of the engine is 3600 R. P. M. and that the converter is built with a ratio $M_1$ stall/$M_1$ shift which will reduce the full throttle speed of the engine at stall to 1200 R. P. M. This reduction in the speed of the engine will obviously reduce its power at stall as compared with its full speed power, but owing to the fact that the double rotation converter can readily provide a torque multiplication as high as ten or twelve, or even more, to one, the desired tractive effort at stall can be obtained even with the engine operating at comparatively very low speed. Thus with this arrangement a single more or less standardized converter is adapted to be combined with engines of widely varying characteristics to give desired tractive effort results, since by the simple expedient of adjusting the gear ratio between the double rotation parts and also adjusting the ratio $r_h/r_a$ the converter can be given torque absorbing characteristics and stall torque characteristics which will pull any given engine down at stall to any specific desired speed to give best fuel economy and other operating characteristics, while at the same time providing satisfactory tractive effort characteristics for the vehicle.

As has been noted above, the difference between the arrangements shown in Figs. 4 and 6 is essentially in the gearing between the reaction and driven members. In the example shown in Fig. 4 the reaction blading 46 is connected to the sun gear 366 which is approximately half the diameter of the ring gear 368 connected to the driven or turbine member 44. Thus the ratio $k$ of the gearing is 2.0, so that the value of the reaction torque and consequently the secondary torque $M_2$ is higher than if the blades 46 were not so connected as to give a multiplied torque. In the case of the example shown in Fig. 6, the reaction blades 46 are connected with the ring gear 504, which is substantially twice the diameter of the sun gear 512 connected to the turbine member. In this instance the gear ratio is 0.5 and while the torque actually applied hydraulically to the blades 46 in this example is reduced in value before being applied to the reaction and driven elements, the total torque multiplication is still greater than for a single rotation converter since the value of $R \times k$ is a factor additive to the factors determinative of the torque multiplication in a single rotation converter.

Thus in the example of gearing shown in Fig. 4, stall torque multiplication will be greater, other things being equal, than with the arrangement shown in Fig. 6.

On the other hand, other factors than the stall torque ratio are involved by varying the gear ratio $r$. In the case of the construction of Fig. 4 the gear ratio results in the reaction blading 46 rotating twice as fast in counter-direction as the turbine blading 34, 36 rotates in forward direction and in this case the efficiency rises from stall comparatively rapidly as the value of $n_2/n_1$ increases. Likewise the efficiency of the converter in double rotation operation reaches its peak and falls relatively rapidy at a comparatively low value of $n_2/n_1$, thus making the desirable shift point from double rotation drive to single rotation drive at a comparatively low value of $n_2/n_1$ which is usually indicative of a relatively low vehicle speed.

In the case of the gearing shown in Fig. 6, the reaction blading in double rotation operation turns in counter-direction at only half the speed of the turbine blading 34, 36. In this case converter efficiency rises more slowly with increase in value of $n_2/n_1$ from stall and peak efficiency in double rotation operation is achieved at a higher value of $n_2/n_1$ so that the proper shift point to single rotation operation will occur at a higher value of $n_2/n_1$ and a higher vehicle speed than with the construction shown in Fig. 4, other factors being equal.

Thus it will be seen that choice of the specific gear ratio to be employed will be dictated by considerations such as the maximum stall torque ratio desired and the range of the efficiency curve in terms of variation in the value of $n_2/n_1$, in individual cases.

In Fig. 8 there is shown more or less conventionally the nature of the efficiency curves obtained with double rotation converters such as shown in Figs. 4 and 6. In this figure the secondary torque is indicated by the curve $M_2$, the efficiency in double rotation operation by $a$, the efficiency in single rotation operation by $b$, the efficiency in direct drive by $c$ and the primary speed characteristics by $n_1$. If for purposes of comparison the curves shown in Fig. 8 are assumed to be representative of the action obtained with a converter of the kind shown in Fig. 4, the effect of changing the gearing to one such as shown in Fig. 6 would be to decrease the value of $M_2$ at stall and move peak of the curve $a$ to the right as seen in Fig. 8 so as to place the peak efficiency point of this curve at a higher value of $n_2/n_1$.

While for purposes of illustrating the principles of the invention as exemplified in both single and double rotation types of converters, specific forms of double rotation converters having rotating casings and also having means for providing single rotation operation and direct drive which is achieved in a particular fashion, the invention is not limited to such specific features of construction since it will be apparent that the stationary casing type of hydraulic system with a through shaft form of direct drive such as is illustrated in Fig. 1 may readily be combined with gearing of the kind shown in Figs. 4 and 6 to provide both double and single rotation operation. Also it will be evident that in cases where desired the feature of single rotation operation or the direct drive feature or both may be omitted. Furthermore, while in the interests of simplicity and minimum cost, two-stage converters of the kind herein illustrated are preferable and will in most instances meet the requirements for traction drives, the principles of the invention are as readily applicable to converters provided with a larger number of stages of turbine and reaction blading.

From the foregoing it will be evident that the invention may be applied in many specific different mechanical embodiments and that if desired certain features may be employed to the exclusion of others. The invention is accordingly to be considered as in no wise limited in its scope to the forms of construction herein disclosed by way of example but is to be considered as embracing in its scope all structures falling within the purview of the appended claims.

What I claim is:

1. A hydrodynamic torque converter comprising a circuit including a primary member carrying fixed pump blading, a secondary member carrying fixed turbine blading and a reaction member carrying fixed reaction blading, said turbine blading being constructed to be rotated by the working fluid in the same direction as that of the pump blading and comprising a row of blades discharging working fluid directly and unobstructedly to the pump blading and the outlet edges of said row of turbine blades being located radially further from the axis of rotation thereof than the radial distance of the inlet edges of the pump blades from their axis of rotation, the blades of the turbine blade row delivering fluid to the pump having an outlet angle within a range of which the upper and lower limits are approximately 35° and 55°, respectively.

2. A converter as defined in claim 1, in which the ratio of the radial distance from their axis of rotation of the outlet edges of the turbine blades delivering fluid to the pump to the radial distance of the inlet edges of the pump blades from their axis of rotation is within a range of which the lower limit has a value of approximately 1.15.

References Cited in the file of this patent

UNITED STATES PATENTS

| | | |
|---|---|---|
| 1,199,360 | Föttinger | Sept. 26, 1916 |
| 1,900,120 | Lysholm et al. | Mar. 7, 1933 |
| 2,005,444 | Weiss | June 18, 1935 |
| 2,042,189 | Rabe | May 26, 1936 |
| 2,055,895 | Fawcett | Sept. 29, 1936 |
| 2,093,127 | Föttinger | Sept. 14, 1937 |
| 2,205,794 | Jandasek | June 25, 1940 |
| 2,280,015 | Tipton | Apr. 14, 1942 |
| 2,291,120 | Tipton | July 28, 1942 |
| 2,308,547 | Schneider | Jan. 19, 1943 |
| 2,349,350 | Jandasek | May 23, 1944 |
| 2,365,879 | Jandasek | Dec. 26, 1944 |
| 2,373,122 | La Brie | Apr. 10, 1945 |
| 2,374,303 | Osborne | Apr. 24, 1945 |
| 2,376,462 | Teagno | May 22, 1945 |
| 2,388,849 | Jandasek | Nov. 13, 1945 |
| 2,397,368 | Pennington | Mar. 26, 1946 |
| 2,441,818 | Jandasek | May 18, 1948 |

FOREIGN PATENTS

| | | |
|---|---|---|
| 894,056 | France | Mar. 6, 1944 |
| 191,022 | Great Britain | Nov. 8, 1923 |
| 432,807 | Great Britain | Aug. 2, 1935 |
| 434,707 | Great Britain | Sept. 6, 1935 |
| 496,299 | Great Britain | Nov. 29, 1938 |
| 218,243 | Switzerland | Mar. 16, 1942 |